No. 772,229. PATENTED OCT. 11, 1904.
A. FAIRLY.
FERTILIZER DISTRIBUTER.
APPLICATION FILED AUG. 17, 1904.
NO MODEL.
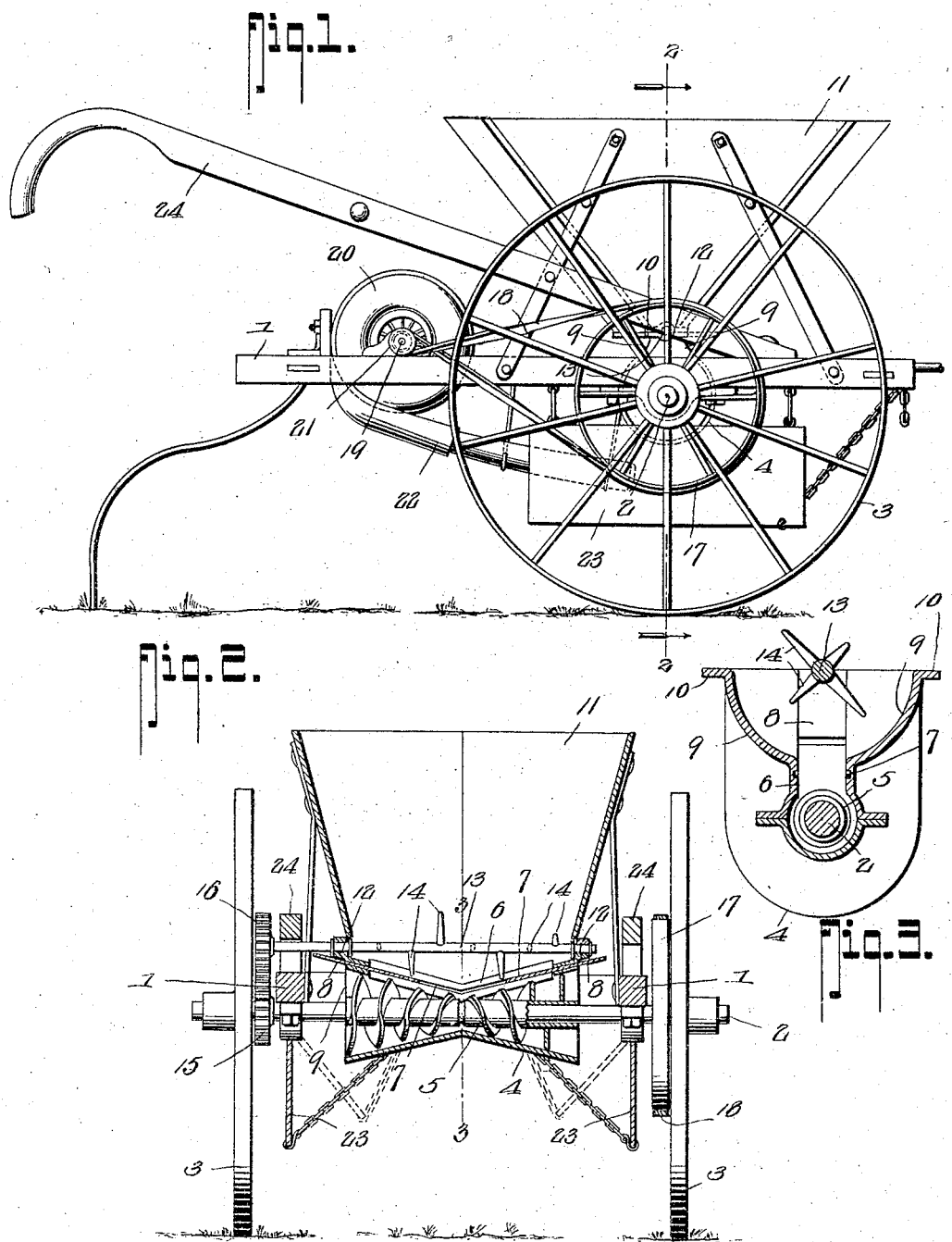
Witnesses
E. F. Stewart
Wm. Bagger
Angus Fairly,
Inventor.
by C. A. Snow & Co.
Attorneys No. 772,229.

Patented October 11, 1904.

UNITED STATES PATENT OFFICE.

ANGUS FAIRLY, OF LAURINBURG, NORTH CAROLINA.

FERTILIZER-DISTRIBUTER.

SPECIFICATION forming part of Letters Patent No. 772,229, dated October 11, 1904.

Application filed August 17, 1904. Serial No. 221,107. (No model.)

*To all whom it may concern:*

Be it known that I, ANGUS FAIRLY, a citizen of the United States, residing at Laurinburg, in the county of Scotland and State of North Carolina, have invented a new and useful Fertilizer-Distributer, of which the following is a specification.

This invention relates to fertilizer-distributers; and it has for its object to provide a machine of this class which shall possess superior advantages in point of simplicity, durability, and general efficiency.

With these and other ends in view, which will readily appear as the nature of the invention is better understood, the same consists in the improved construction and novel arrangement and combination of parts which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that changes and modifications may be made within the scope of the invention when such changes may be effected without departing from the spirit or sacrificing the efficiency of the same.

In said drawings, Figure 1 is a side elevation of a fertilizer-distributer constructed in accordance with the principles of the invention. Fig. 2 is a transverse sectional view, and Fig. 3 is a sectional detail view taken on the line 3 3 in Fig. 2.

Corresponding parts in the several figures are indicated by similar characters of reference.

In carrying out the invention a frame 1, mainly rectangular in shape, is provided, said frame being provided with bearings for an axle 2, carrying ground-engaging wheels 3. Suitably supported between the side pieces of the frame is an hour-glass-shaped casing 4, through which the shaft or axle 2 extends axially, as shown. Said shaft or axle supports a double or right and left hand screw 5, which in any suitable manner is associated with said axle.

The casing 4 is provided in its upper side with slots or openings 6, at the edges of which grooves 7 are formed to accommodate slides 8, which are accessible from the ends of the casing and which may be so adjusted that an opening of any desired size shall be left centrally in the upper side of the casing. The latter is provided with laterally-extending side pieces 9 9, provided at their upper edges with flanges 10, which latter support a hopper 11. The ends of the casing are formed with upwardly-extending boxings 12, affording bearings for a shaft 13, which is disposed transversely in the lower part of the hopper and which is provided with stirring or agitating fingers 14, said fingers operating in the space bounded by the side pieces 9 of the screw-casing.

One end of the shaft or axle 2 is provided with a pinion 15, meshing with a pinion 16 upon the agitator-shaft 13, to which a rotary motion is thus communicated. From the opposite end of the axle motion is transmitted, by means of a pulley 17 and belt 18 or other suitable means, to the shaft 19 of a rotary fan mounted in a casing 20, which is supported upon the frame of the machine in rear of the hopper, the fan-shaft being provided with a pulley 21, engaged by the belt 18. The blast generated by the fan is directed through the exit 22 of the fan-casing in a forward direction. This fan attachment, however, is intended to be used only when it is desired to strew the fertilizing material broadcast, as will be presently described.

Flexibly connected with the sides of the frame are deflecting-boards 23, which receive the discharge from the ends of the screw-casing and which may be adjusted by any suitable means provided for the purpose in order to cause the fertilizing material discharged upon said deflecting-boards to be deflected inwardly to any desired extent, so as to drop in a furrow which may have been formed previously or which may be formed by a furrow-opener of ordinary construction connected with the frame of the machine. Such furrow-opener, however, has not been illustrated in the present form of the invention, where the frame is provided with handles 24, by means of which the device may be manually propelled. It is obvious, however, that the attachment of a furrow-opener and suitable draft attachments is entirely within the scope of the invention.

From the foregoing description, taken in connection with the drawings hereto annexed, the operation and advantages of this invention will be readily understood by those skilled in the art to which it appertains. When the machine is propelled over the ground, the fertilizing material contained in the hopper will be agitated by the fingers upon the rotary shaft provided for the purpose and will be caused to pass into the central portion of the screw-casing through the slot or opening 6, the size of which has been previously regulated. The fertilizing material will be fed by the double screw to the ends of the casing, where it is discharged upon the deflecting-boards, whereby it is guided to the furrow. Should it be desired to scatter the fertilizing material broadcast, the free edges of the deflecting-boards are placed closely together, and the fertilizing material thus concentrated into a single stream is intercepted by the blast issuing from the blower, whereby it is scattered broadcast, as will be readily understood. When the delivery of the fertilizing material is to be controlled by the deflecting-boards, the means for transmitting motion to the blower may be disconnected, as will be readily understood.

This improved fertilizer-distributer is simple in construction, easily operated, and the fertilizing material will be fed positively in any desired quantity which is capable of perfect regulation.

Having thus described the invention, what is claimed is—

1. In a fertilizer-distributer, an hour-glass-shaped casing slotted in its upper side and provided with grooves and covers slidable in said grooves, in combination with a wheel-carrying axle extending through said casing, and a double, right and left hand screw on said axle.

2. In a fertilizer-distributer, an hour-glass-shaped casing having a slot, covering means for said slot, divergent side pieces having hopper-supporting flanges and provided at the ends thereof with boxings, in combination with a wheel-supported axle extending through said casing and having a right and left hand screw-thread in the latter, an agitator-shaft extending through the hopper and having its bearings in the boxings at the ends of the casing, and means for transmitting motion to said shaft from the wheel-supported axle.

3. In a fertilizer-distributer, an hour-glass-shaped casing having a slot in its upper side and provided with laterally-diverging side pieces having hopper-supporting flanges, a wheel-supported axle extending through the casing and having a double screw within the latter, and deflectors suitably supported to receive the material discharged at the ends of the casing.

4. In a fertilizer-distributer, an hour-glass-shaped casing supported by said frame, said casing having a slot in its upper side and means for regulating said slot, side pieces diverging laterally from the casing, a hopper supported on said side pieces, an agitator-shaft extending transversely through said hopper, bearings for said agitator-shaft upon the ends of the casing, a wheel-supported axle extending through the casing, a double screw upon said axle within said casing, and deflecting members flexibly connected with the frame and adapted to receive the discharge at the ends of the casing.

5. In a fertilizer-distributer, a frame, an hour-glass-shaped casing supported by said frame, a wheel-supported shaft extending through said casing and having bearings upon the frame, a double screw upon said shaft within the casing, a hopper supported above the casing, means for regulating the passage of material from the hopper to the casing, deflectors at the discharge ends of the latter, a blower, and means for transmitting motion to the fan of the blower from a supporting-wheel of the machine.

In testimony that I claim the foregoing as my own I have hereto affixed my signature in the presence of two witnesses.

ANGUS FAIRLY.

Witnesses:
  JOHN FAIRLY MCINTYRE,
  JAMES T. MCLAURIN.